May 7, 1935. A. HAPPEL 2,000,593
VARIABLE SPEED TRANSMISSION
Filed Aug. 14, 1933 2 Sheets-Sheet 1
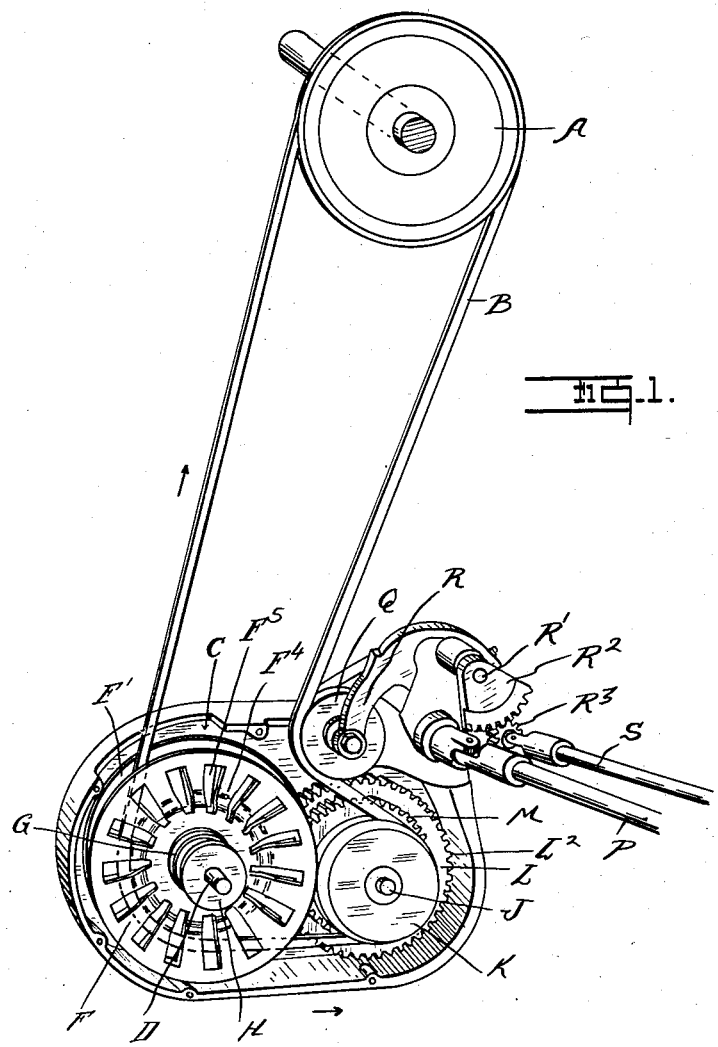
Inventor
Albert Happel
Whittemore Hulbert
Whittemore & Belknap
By
Attorneys

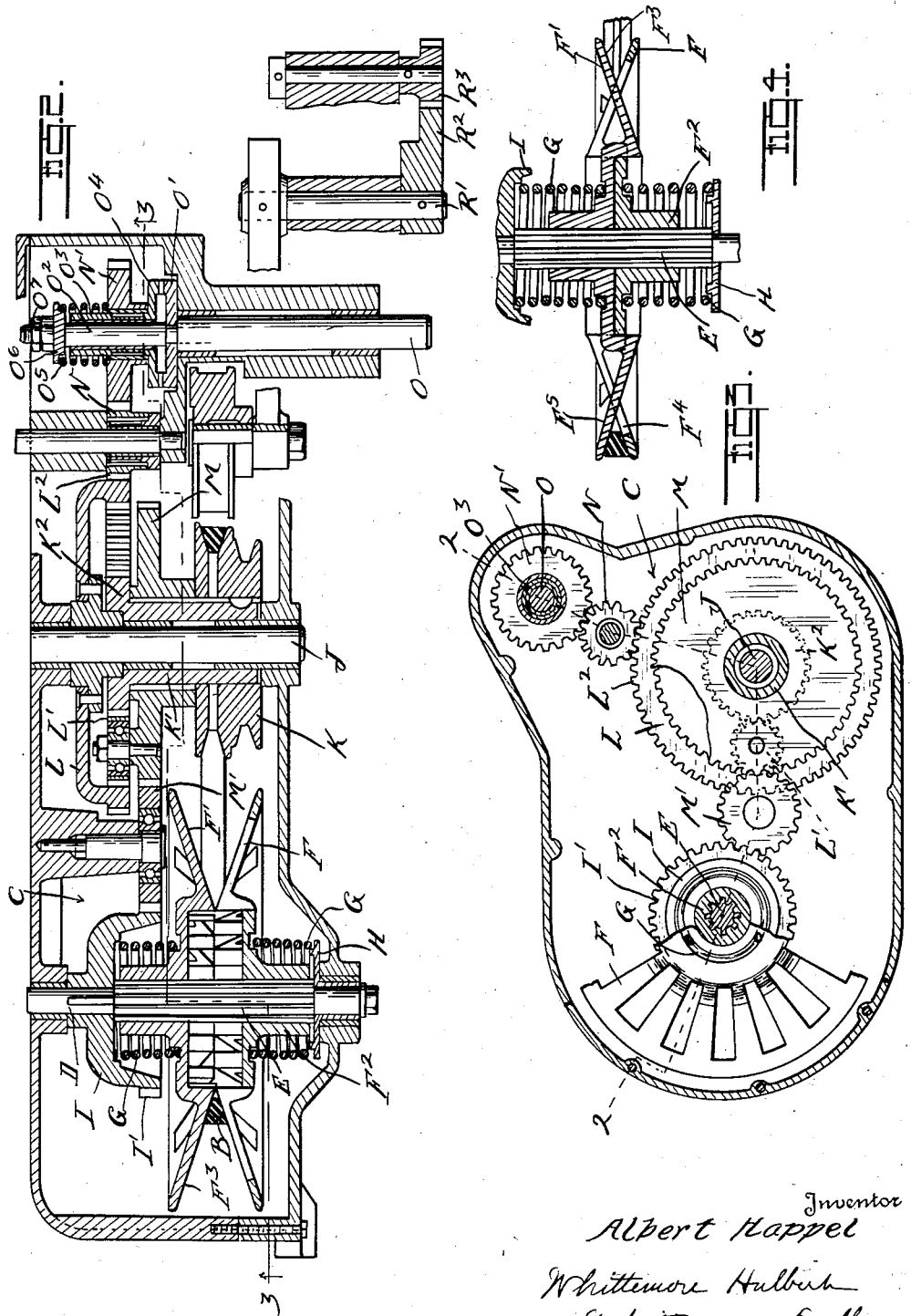

Patented May 7, 1935

2,000,593

UNITED STATES PATENT OFFICE 2,000,593

VARIABLE SPEED TRANSMISSION

Albert Happel, Toledo, Ohio, assignor to Kent-Owens Machine Company, Toledo, Ohio, a corporation of Ohio Application August 14, 1933, Serial No. 685,106

6 Claims. (Cl. 74—286)

The invention relates to variable speed transmissions of that type permitting of infinite variation between predetermined low and high limits. In the present state of the art one construction of variable transmission of the above type employs a belt engaging a grooved pulley having the opposite sides of the groove adjustable in relation to each other. This permits of varying the ratio by changing the radial distance between the axis of the pulley and the point of engagement of the belt therewith. The present invention makes use of such means for varying the ratio but greatly simplifies the construction and facilitates control of the same. To this end the invention consists in various features of construction as hereinafter set forth.

Fig. 1 is a perspective view of my improved variable speed transmission with the cover plate of the housing removed;

Fig. 2 is a sectional elevation thereof on line 2—2 of Fig. 3;

Fig. 3 is a section on line 3—3 of Fig. 2;

Fig. 4 is a view similar to a portion of Fig. 2 showing the parts in a different position of adjustment.

My improvement is particularly adapted for use in connection with machine tools as a means for varying the feed and as specifically illustrated, it is designed for this purpose. It is obvious, however, that the invention is equally applicable to various other uses. As shown, A is a driving pulley grooved to receive a belt B leading to the variable speed transmission unit C. This unit comprises a suitable housing within which are arranged the various parts of the mechanism as follows: D is a shaft extending transversely of the casing and journaled in bearings in the opposite walls thereof. This shaft has a splined portion E on which are mounted the pulley sections F and F' slidable towards or from each other longitudinally of the shaft but rotatively connected therewith. Each of the pulley sections F and F' is provided with a hub portion $F^2$ and a conical annular portion $F^3$ surrounding the same. This conical annular portion projects axially beyond the hub and has a series of segments $F^4$ cut away to receive the intermediate segment $F^5$ of the opposed section. Thus where the sections F and F' are moved towards each other the portions $F^3$ will interengage to reduce the width of the V-shaped groove therebetween which receives the belt B and consequently said belt will be forced to the outer periphery of the pulley. On the other hand, if the sections F and F' are moved apart, the space between the portions $F^3$ will be enlarged in width permitting the belt to move radially inward to the inner periphery of said portions.

Surrounding the hub $F^2$ are coil springs G, the inner ends of which bear against said sections F F' while the outer ends engage abutments mounted on the shaft D. One of these abutments is formed by a disk H and the other by a member I provided with peripheral gear teeth I'. Thus the tension of the springs G will automatically force the pulley sections F' towards each other, while the adjustment of the belt radially inward between said sections will force the same apart against the tension of said springs.

With the construction as thus far described, it will be evident that the rotary movement transmitted from the pulley A to the shaft D will vary in speed and torque ratio in accordance with the tension placed on the belt B relative to the tension on the springs G which will determine the radial distance of the belt from the axis of the pulley. Thus an increase in the tension on the belt will overcome the resistance of the spring G and force said belt radially inward on the pulley, while a decrease in tension on the belt will permit the springs to force the belt radially outward on the pulley. To increase the range of variation I have, however, combined with the pulley a differential gearing, the construction of which is as follows:

J is a shaft arranged parallel to the shaft D, K is a pulley mounted upon this shaft and having a V-groove in its periphery for receiving the belt B. The pulley K is connected by a sleeve or tubular shaft K' with a gear wheel $K^2$ which forms the sun gear of a planetary gearing, also comprising the internal gear wheel L and planetary gear or gears L' between the same and the gear wheel $K^2$. The planetary gears L' are mounted upon a gear carrier M which is rotatively mounted upon the sleeve K' and is in mesh with an intermediate gear M' arranged between the same and the gear wheel I' on the shaft D. The arrangement is such that the belt B not only drives the pulley F but also the pulley K and through the latter the sun gear $K^2$, the speed of which has a fixed relation to the belt speed. On the other hand the speed of the pulley F, shaft D and gear wheel I', all of which revolve together, is determined by the position of the belt radially with respect to the pulley F which varies in accordance with the tension on the belt relative to the tension of the springs G.

Thus the internal gear wheel L has its speed determined by the relative speeds of the sun gear K² driven by the pulley K and the planetary gear carrier M driven by the gear wheel I' on the shaft D. This internal gear wheel L is further provided with external gear teeth L² which run in mesh with an intermediate gear N driving a gear wheel N' on a shaft O which is the power take-off shaft of the mechanism. This driven shaft may be connected by any suitable means such as the flexible shaft P with the device which is to be driven at variable speed.

To change the tension upon the belt B I have provided an idler Q which is mounted on the end of a rock arm R secured to a rock shaft R'. Upon this rock shaft is a gear segment R² which is in mesh with the pinion R³ connected by a flexible shaft S to the manually operable control. Thus to change the speed in the power take off shaft O the operator adjusting the manual control will rotate the shaft S, pinion R³, gear segment R², rock shaft R' and rock arm R, thereby moving the belt tightener Q laterally with respect to the belt. This movement is also preferably in a direction substantially tangent to the pulley K, so as to maintain the wrap of the belt around said latter pulley in all positions of adjustment.

In the complete operation of the mechanism, assuming that the pulley A is driven at constant speed, the speed of the shaft O and flexible shaft P driven thereby may be varied as desired by a rotary adjustment of the shaft S which as just described will move the belt tightener pulley Q either inward or outward. The inward movement of this tightener pulley will increase the tension on the belt B so as to draw the same radially inward between the pulley sections F and F' against the resistance of the springs G. This will increase the rotational speed of the shaft D and through the gear wheels I', M' and M will change the orbital speed of the planetary gear wheels L'. However, the sun gear K², which is driven by the pulley K and belt B maintains its constant speed so that the speed of the internal gear wheel L will be determined by the difference in ratio between this orbital movement and the rotary movement of the sun gear. The gear wheel L², gear wheel N' and intermediate gear N form a train through which movement is imparted to the shaft O.

When the belt B is adjusted radially outward with respect to the pulley F the friction load on the belt would be at the minimum whereas an adjustment of the belt radially inward with respect to the pulley would correspondingly increase the friction load. To compensate for this variation the springs G are so constructed that the pressure against the sides of the belt is increased substantially in proportion to the increase in friction load. This supplies just the necessary pressure in all positions of adjustment to prevent the slipping of the belt.

To protect the mechanism from overload, I preferably arrange between the gear train and the power take off shaft O a clutch which may be adjusted to transmit only a limited torque. As shown, the shaft O has mounted thereon a clutch plate O' and is provided with an extension O² of reduced diameter. On this extension is a sleeve O³ having a cooperating clutch plate O⁴ and the gear wheel N' is directly mounted and keyed to the sleeve O³. O⁵ is a spring surrounding the sleeve O³, one end bearing against the gear wheel N' and its opposite end against a collar O⁶ adjustably secured to the shaft O² by nuts O⁷. Thus the resilient pressure of the spring O⁵ will hold the clutch plates O' and O⁴ in engagement with each other to transmit a predetermined load, but any overload will permit disengagement of these clutch plates so as to protect the gears from injury.

What I claim as my invention is:

1. A variable speed transmission comprising a gear train including a planetary transmission, grooved pulleys connected to said gear train in driving relation to two members of said planetary transmission and so arranged that they rotate in a common plane, one of said pulleys being provided with opposed conical side sections located upon opposite sides of said plane and axially adjustable in relation to it and to each other, resilient means for forcing said side sections towards each other, a belt having its path of travel confined in said plane and forming a driving connection between said pulleys, and means rockably mounted in the aforesaid plane for varying the ratio of tension of said belt to said resilient means to balance the same in different positions of radial adjustment with respect to the axis of the pulley with the adjustable side sections to thereby change the ratio of said gearing.

2. In a variable speed transmission, the combination with rotary drive and driven members, of a planetary gearing intermediate said drive and driven members including a sun gear, a concentric gear, planetary gears and a planetary gear carrier, pulleys connected in driving relation to two of the members of said planetary gearing, one of said pulleys having side sections axially adjustable in relation to each other, resilient means for pressing said side sections towards each other, a belt engaging both of said pulleys and means for varying the ratio of tension on said belt to said resilient means to balance the same in different positions of radial adjustment with respect to the axis of the pulley with adjustable side sections to vary the speed of one of said planetary transmission members while maintaining unvarying speed of another of said planetary gear members and thereby varying the ratio of the gearing.

3. In a variable speed transmission, the combination with rotary drive and driven members, of a planetary gearing intermediate said drive and driven members including a sun gear, a concentric gear, planetary gears and a planetary gear carrier, pulleys connected in driving relation to said sun gear and one of the other members of said planetary gearing, the latter pulley being provided with side sections axially adjustable in relation to each other, resilient means for pressing said side sections towards each other, a belt forming a driving connection between said pulleys, and means for varying the ratio of tension on said belt to said resilient means to balance the same in different positions of radial adjustment of the belt with respect to the axis of the pulley having adjustable side sections to vary the ratio of transmission through both the belt and said gearing.

4. A variable speed transmission comprising a gear train including a planetary transmission, a plurality of grooved pulleys connected to said gear train in driving relation to two members of said planetary transmission and so arranged that they rotate in a common plane, one only of said pulleys being provided with opposed conical side sections located upon opposite sides of said plane and axially adjustable in relation to it and to each other, a belt having its path of travel confined to said plane and forming a driving connection between said pulleys, means for adjusting said belt in its plane towards or from the axis of said pulley with adjustable sides, and coacting means for adjusting said adjustable sides equally in relation to said common plane to maintain driving contact between said belt and pulley in all positions of adjustment thereof.

5. In a variable speed transmission, the combination with rotary drive and driven members, of a planetary gearing intermediate said drive and driven members including a sun gear, a concentric gear, planetary gears and a planetary gear carrier, pulleys connected in driving relation to one of the members of said planetary gearing, one of said pulleys having side sections axially adjustable in relation to each other, a belt engaging both of said pulleys, means for adjusting said belt in the plane thereof towards or from the axis of said pulley with adjustable sides, and coacting means for adjusting said sides equally in relation to said common plane to maintain driving contact between the belt and said pulley in all positions of adjustment and to vary the speed of one of said planetary transmission members while maintaining unvarying speed of another of said planetary gear members and thereby varying the ratio of the gearing.

6. In a variable speed transmission, the combination with rotary drive and driven members, of a planetary gear intermediate said drive and driven members including a sun gear, a concentric gear, planetary gears and a planetary gear carrier, pulleys connected in driving relation to said sun gear and one of the other members of said planetary gearing, the latter pulley being provided with side sections axially adjustable in relation to each other, a belt forming a driving connection between said pulleys, means for adjusting said belt in its plane towards or from the axis of said pulley with adjustable sides, and means for simultaneously adjusting said sides in relation to the plane of the belt to maintain driving contact between said belt and pulley in all positions of adjustment thereof, and to thereby vary the ratio of transmission through both the belt and said gearing.

ALBERT HAPPEL.